(No Model.)
A. W. MILLER.
BICYCLE LOCK.
No. 583,291. Patented May 25, 1897.
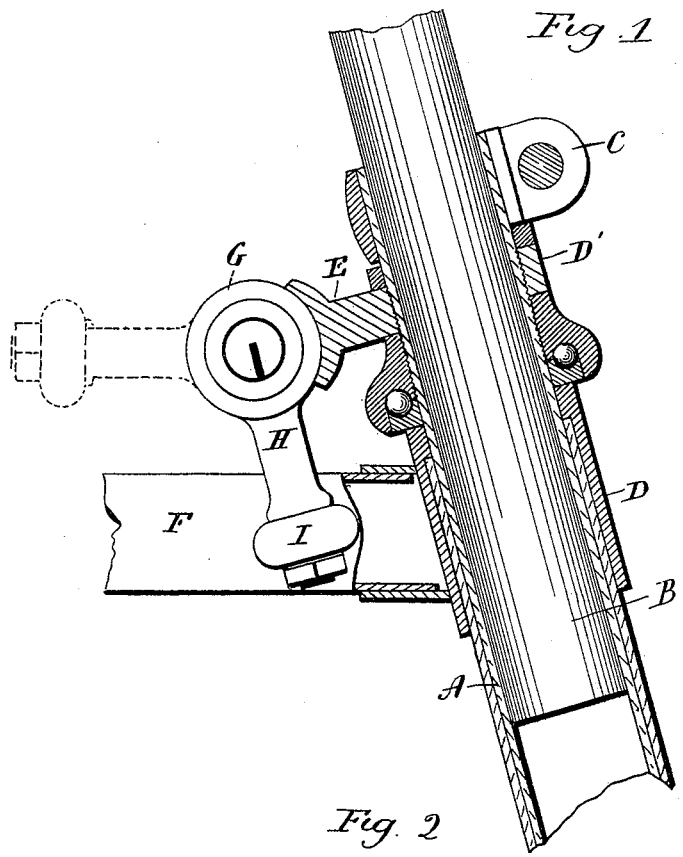
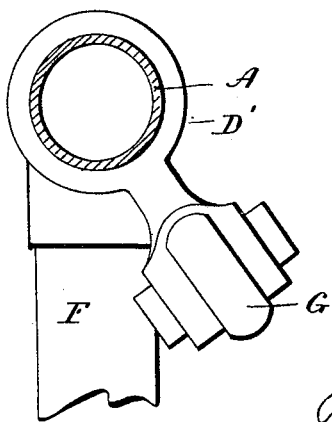

UNITED STATES PATENT OFFICE.

ROBERT W. MILLER, OF WATERBURY, CONNECTICUT, ASSIGNOR OF ONE-HALF TO JOHN C. MILLER, OF SAME PLACE.

BICYCLE-LOCK.

SPECIFICATION forming part of Letters Patent No. 583,291, dated May 25, 1897.

Application filed April 6, 1896. Renewed April 9, 1897. Serial No. 631,440. (No model.)

*To all whom it may concern:*

Be it known that I, ROBERT W. MILLER, of Waterbury, in the county of New Haven and State of Connecticut, have invented a new Bicycle-Lock; and I do hereby declare the following, when taken in connection with the accompanying drawings and the letters of reference marked thereon, to be a full, clear, and exact description of the same, and which said drawings constitute part of this specification, and represent, in—

Figure 1, a side view, partially in section, of the upper end of the front fork and a portion of the upper part of the frame of a bicycle, illustrating the application of my lock thereto; Fig. 2, a top view illustrating the parts in the locked position.

This invention relates to an improvement in locks for bicycles. It has been found that the most satisfactory locks for bicycles are those in which the front fork and handle-bar may be locked to the frame when the front wheel is turned out of line with the rear wheel, and this is for the reason that if a person mounts the wheel when it is locked he will not injure the parts by forcing the wheel forward, but will simply ride in a circle until the lock is released. It is desirable that locks of this character should be arranged to take effect where the frame is strongest, and hence least liable to strain or break the machine.

The object of this invention is to provide a lock of this character and arrange it at the upper end of the front fork and so as to interlock that fork with the upper bar of the frame when the front wheel is turned out of line with the rear wheel; and it consists in the construction hereinafter described, and particularly recited in the claim.

A represents the upper end of a frame, and B the stem or tube of the handle-bar, which are adapted to clamp together by a collar C and mounted in the head D, all of usual construction. To the upper end of the fork A and below the clamping-collar C, I place a ring D', formed with an arm E, which projects rearward over the upper bar F of the frame when the wheels are in line with each other. The outer end of this arm is bifurcated, and between its ends is hung a cylinder G, which is constructed with a locking-arm H, the lower end of which is reduced and threaded to receive a rubber fender I. The position of this arm is such that when the wheels are in line with each other it will extend directly in line with the upper bar F of the frame, and when the front wheel is turned out of line with the rear wheel the shank may fall upon one side or the other, as the case may be, of the said bar. Between the cylinder and the ends of the shank E, I arrange a suitable lock mechanism, whereby the shank H may be held in either the raised or lowered position, and so that if the wheels be turned out of line and the shank locked in the down position it will take a bearing upon one side of the upper bar of the frame and prevent the forward wheel being turned into line with the rear wheel. It will thus be seen that if the bicycle is locked the rider can mount and ride a short distance without possible injury to any of the parts, but will immediately discover that it is locked on account of the circuitous course the wheels will necessarily take. By arranging a lock between the head and the upper bar of the frame its bearings are at the strongest parts of the machine, and, furthermore, the lock is easy of access and in no wise interferes with the movements of the rider.

It will be understood from the foregoing that I am aware that locks have been arranged to hold the wheels out of line with each other, and I do not, therefore, wish to be understood as claiming, broadly, such as my invention; but What I do claim is—

In a bicycle, the combination with a frame thereof, of a fork, a steering-rod extending upwardly therefrom and having bearing in the frame, a supporting-arm connected with the said steering-rod and projecting rearward therefrom, a locking-arm pivotally secured to the said supporting-arm and so as to stand at one side of the upper bar of the frame when the wheels of the machine are out of line, and lock mechanism between the said arms whereby the said locking-arm may be held in its locking position, substantially as described.

In testimony whereof I have signed this specification in the presence of two subscribing witnesses.

ROBT. W. MILLER.

Witnesses:
FRANK P. BRETT,
JOHN W. MCDONALD.